(12) United States Patent
Shin et al.

(10) Patent No.: US 9,110,531 B2
(45) Date of Patent: Aug. 18, 2015

(54) DISPLAY PANEL, DISPLAY APPARATUS HAVING THE SAME AND METHOD OF DRIVING THE DISPLAY APPARATUS

(75) Inventors: Kyoungju Shin, Hwaseong-si (KR); Chongchul Chai, Seoul (KR); Soo-Wan Yoon, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 1040 days.

(21) Appl. No.: 12/757,872

(22) Filed: Apr. 9, 2010

(65) Prior Publication Data

US 2010/0271327 A1 Oct. 28, 2010

(30) Foreign Application Priority Data

Apr. 27, 2009 (KR) .................. 10-2009-0036537

(51) Int. Cl.
*G06F 3/045* (2006.01)
*G06F 3/041* (2006.01)
*G02F 1/1333* (2006.01)
*G06F 3/044* (2006.01)
*G09G 3/36* (2006.01)
*G02F 1/1339* (2006.01)

(52) U.S. Cl.
CPC .......... *G06F 3/0412* (2013.01); *G02F 1/13338* (2013.01); *G06F 3/044* (2013.01); *G09G 3/3688* (2013.01); *G02F 1/13394* (2013.01); *G09G 2300/0465* (2013.01); *G09G 2300/0809* (2013.01); *G09G 2310/08* (2013.01)

(58) Field of Classification Search
CPC .................................................. G06F 3/0414
USPC ........................................................ 345/174
See application file for complete search history.

(56) References Cited

U.S. PATENT DOCUMENTS

| 6,243,069 B1 * | 6/2001 | Ogawa et al. ................. 345/102 |
| 2003/0234769 A1 * | 12/2003 | Cross et al. ................... 345/173 |
| 2004/0189928 A1 | 9/2004 | Yang et al. |
| 2006/0262099 A1 * | 11/2006 | Destura et al. ................ 345/173 |
| 2007/0070047 A1 * | 3/2007 | Jeon et al. ..................... 345/173 |
| 2007/0195029 A1 * | 8/2007 | Jeon et al. ........................ 345/87 |
| 2008/0002075 A1 | 1/2008 | Yang et al. |
| 2008/0036959 A1 * | 2/2008 | Yang et al. .................... 349/155 |

(Continued)

FOREIGN PATENT DOCUMENTS

| JP | 2007503640 | 2/2007 |
| KR | 10-2004-0084480 A | 10/2004 |

(Continued)

*Primary Examiner* — Kathy Wang-Hurst
*Assistant Examiner* — Peijie Shen
(74) *Attorney, Agent, or Firm* — Innovation Counsel LLP

(57) ABSTRACT

In a display panel, a display apparatus having the display panel, and a method of driving the display apparatus, a conductive spacer is interposed between an array substrate and an opposite substrate, and the conductive spacer electrically connects a pixel electrode and a common electrode when a touch event occurs for one or more embodiments. When a common voltage is applied to the pixel electrode by the touch event, an electric potential of a data line is lowered by the common voltage through a turned-on switching device. A signal reader periodically reads out the voltage of the data line and senses the touch event using the read-out voltage to detect a touch position at which the touch event occurs. Thus, the display panel having a touch screen function may be manufactured, and an aperture ratio in the display panel may be prevented from being deteriorated.

21 Claims, 13 Drawing Sheets

(56) References Cited

U.S. PATENT DOCUMENTS

| | | | |
|---|---|---|---|
| 2008/0062148 A1* | 3/2008 | Hotelling et al. | 345/174 |
| 2008/0117182 A1* | 5/2008 | Um et al. | 345/173 |
| 2009/0073138 A1 | 3/2009 | Lee et al. | |
| 2010/0194698 A1* | 8/2010 | Hotelling et al. | 345/173 |

FOREIGN PATENT DOCUMENTS

| | | |
|---|---|---|
| KR | 10-2004-0085797 A | 10/2004 |
| KR | 1020090003996 | 1/2009 |
| KR | 10-2009-0027948 A | 3/2009 |

* cited by examiner

DISPLAY PANEL, DISPLAY APPARATUS HAVING THE SAME AND METHOD OF DRIVING THE DISPLAY APPARATUS

CROSS-REFERENCE TO RELATED APPLICATION

This application relies for priority upon Korean Patent Application No. 10-2009-36537 filed on Apr. 27, 2009, the contents of which are herein incorporated by reference in its entirety.

BACKGROUND

1. Technical Field

The present invention in accordance with one or more embodiments relates to a display panel, a display apparatus, and a method of driving the display apparatus. More particularly, the present invention in accordance with one or more embodiments relates to a display panel having a touch screen function, a display apparatus having the display panel, and a method of driving the display apparatus.

2. Description of the Related Art

In general, a touch panel is mounted on an image display apparatus such that a user can select an order content displayed on the image display apparatus by touching the touch panel with a finger or other objects. The image display apparatus having the touch panel adapted thereto detects a touch position of a touch event applied on the touch panel, receives the order content corresponding to the touch position as an input signal, and operates in response to the input signal.

Since the image display apparatus employing the touch panel does not require a separate input device, such as a keyboard or a mouse, to be connected to the image display apparatus, the image display apparatus having the touch panel has been widely used.

Recently, the touch panel has been employed in a liquid crystal display as an input device, and the touch panel is mounted above and proximate to a liquid crystal display panel displaying an image thereon to detect location information corresponding to touch events by a user. However, when the touch panel is formed separately from the liquid crystal display panel, optical characteristics of the liquid crystal display, such as brightness, viewing angle, etc., are negatively affected, and a thickness of the liquid crystal display is increased by the thickness of the touch panel.

SUMMARY

An exemplary embodiment of the present disclosure provides a display panel capable of performing a touch screen function and preventing the reduction of aperture ratio.

Another exemplary embodiment of the present disclosure also provides a display apparatus employing the display panel.

Another exemplary embodiment of the present disclosure also provides a method of driving the display apparatus.

In an exemplary embodiment of the present disclosure, a display panel includes an array substrate, an opposite substrate, and a conductive spacer. The array substrate includes a first base substrate, a data line arranged on the first base substrate, a gate line crossing the data line, a first switching device connected to the data line and the gate line, and a pixel electrode connected to the first switching device. The opposite substrate includes a second base substrate facing the first base substrate and a common electrode arranged on the second base substrate. The conductive spacer is interposed between the array substrate and the opposite substrate and connected to the common electrode, the conductive spacer configured to electrically connect the data line and the common electrode in response to an external pressure.

In another exemplary embodiment of the present disclosure, a display apparatus includes a display panel, a gate driver, a data driver, and a signal reader. The display panel includes an array substrate, an opposite substrate, and a conductive spacer. The array substrate includes a first base substrate, a data line arranged on the first base substrate, a gate line crossing the data line, a switching device connected to the data line and the gate line, and a pixel electrode connected to the switching device. The opposite substrate includes a second base substrate facing the first base substrate and a common electrode arranged on the second base substrate. The conductive spacer is interposed between the array substrate and the opposite substrate and connected to the common electrode. The conductive spacer configured to electrically connect the data line and the common electrode in response to a touch event.

The data driver adapted to apply a data voltage to the data line, and the gate driver adapted to apply a gate signal to the gate line. The signal reader adapted to sense the touch event using a voltage of the data line and detects a position at which the touch event occurs.

In another exemplary embodiment of the present disclosure, a method of driving the display apparatus is provided as follows.

A gate voltage is applied to a gate line to turn on a switching device. A data voltage applied to a data line is provided to a pixel electrode through the turned-on switching device. The data line is electrically connected to a common electrode in response to a touch event to lower a voltage of the data line. A signal reader senses the voltage of the data line and reads out the sensed voltage to sense the touch event and detect a position where the touch event occurs.

According to the above, the conductive spacer interposed between the array substrate and the opposite substrate electrically connects the pixel electrode and the common electrode in response to the touch event to lower an electric potential of the data line to a common voltage. The signal reader periodically reads out the voltage of the data line to sense the touch event using the read-out voltage and detect the position at which the touch event occurs.

Thus, the display panel having a touch screen function may be manufactured without decreasing the aperture ratio since additional wires are not required to be added to the display panel.

BRIEF DESCRIPTION OF THE DRAWINGS

The above and other advantages of embodiments of the present invention will become readily apparent by reference to the following detailed description when considered in conjunction with the accompanying drawings wherein.

DETAILED DESCRIPTION

Figure 1:
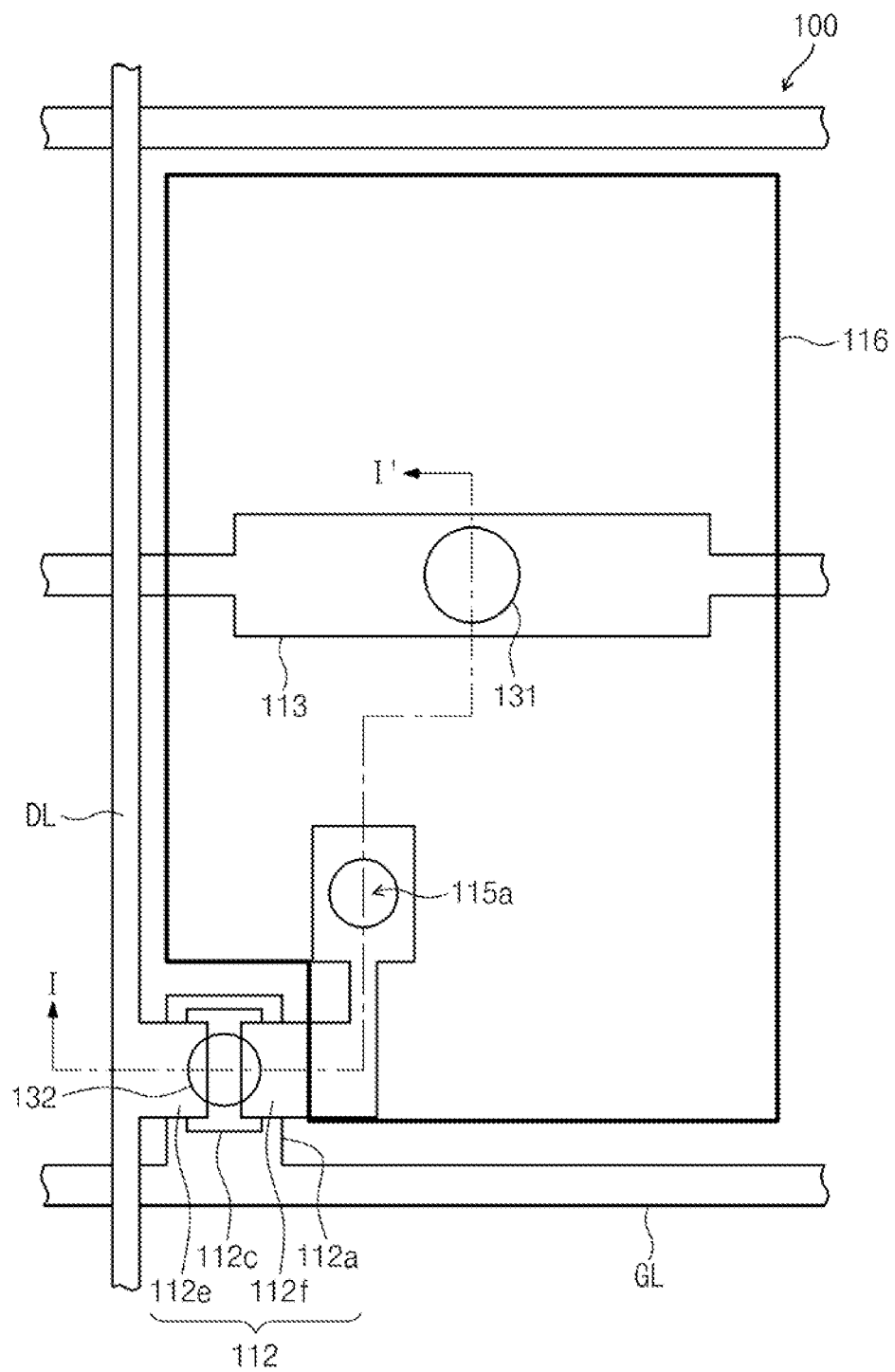
FIG. 1 is a plan view showing a liquid crystal display panel in accordance with an embodiment.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be explained in detail with reference to the accompanying drawings.

Hereinafter, a liquid crystal display in accordance with an embodiment is described. The liquid crystal display includes a liquid crystal display panel on which an image is displayed, and a plurality of pixels is arranged in a matrix configuration in the liquid crystal display panel. Also, since each pixel has the same structure and function, for the convenience of explanation, only one pixel is described in detail, and detailed descriptions of other pixels are omitted.

Figure 2:
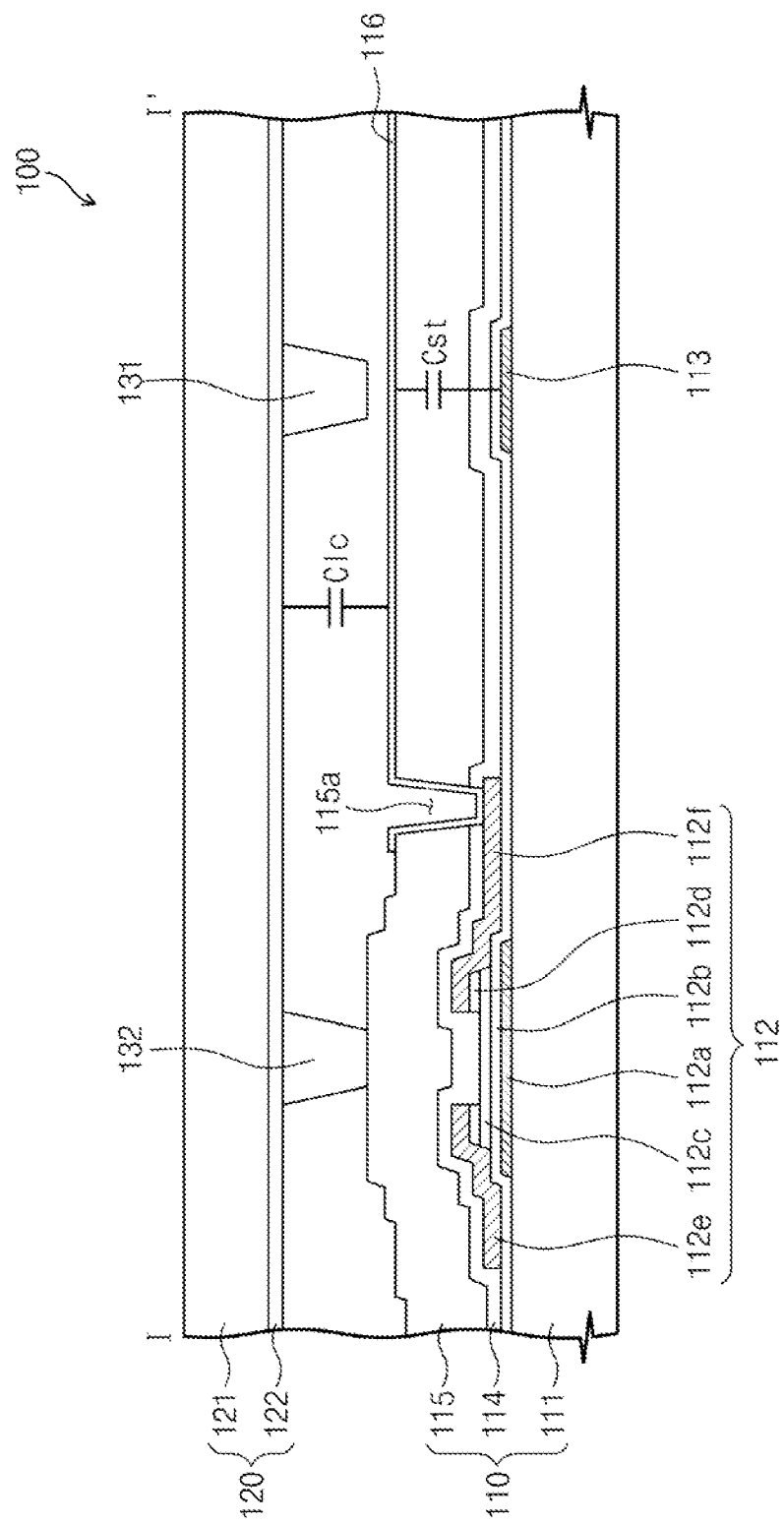
FIG. 2 is a sectional view taken along a line I-I' of FIG. 1 in accordance with an embodiment.

FIG. 1 is a plan view showing an exemplary embodiment of a liquid crystal display panel, and FIG. 2 is a sectional view taken along a line I-I' of FIG. 1.

Referring to FIGS. 1 and 2, a liquid crystal display panel 100 includes an array substrate 110, an opposite substrate 120 facing the array substrate 110, a conductive spacer 131 arranged between the array substrate 110 and the opposite substrate 120, and a liquid crystal layer (not shown) interposed between the array substrate 110 and the opposite substrate 120.

The array substrate 110 includes a first base substrate 111, a data line DL, a gate line GL, a thin film transistor 112, and a pixel electrode 116. The data line DL extends in a first direction on the first base substrate 111. The gate line GL extends in a second direction which is substantially perpendicular to the first direction to cross the data line DL, and is insulated from the data line DL. The thin film transistor 112 is connected to the data line DL and the gate line GL. Particularly, the thin film transistor 112 includes a source electrode 112e connected to the data line DL, a gate electrode 112a connected to the gate line GL, and a drain electrode 112f connected to the pixel electrode 116.

The first base substrate 111 further includes a storage electrode 113 arranged thereon to extend substantially in parallel with the gate line GL. The storage electrode 113 partially overlaps with the pixel electrode 116.

The opposite substrate 120 includes a second base substrate 121 facing the first base substrate 111 and a common electrode 122 arranged on the second base substrate 121.

The conductive spacer 131 is interposed between the array substrate 110 and the opposite substrate 120 and electrically connected to the common electrode 122. The conductive spacer 131 is arranged corresponding to (e.g. overlaps) the storage electrode 113 in an area in which the pixel electrode 116 is formed. Since an area in which the storage electrode 113 is formed is a non-effective display area, a deterioration of an aperture ratio caused by the conductive spacer 131 may be prevented as the conductive spacer 131 is formed in the area in which the storage electrode 113 is formed.

Before a touch event occurs, the conductive spacer 131 is maintained spaced apart from the pixel electrode 116 by a predetermined distance and electrically insulated from the pixel electrode 116. However, when a touch event occurs, the conductive spacer 131 makes contact with the pixel electrode 116 to electrically connect the common electrode 122 to the pixel electrode 116.

A supporting spacer 132 is further arranged in an area in which the thin film transistor 112 is formed to maintain a cell gap of the liquid crystal display panel 100. The supporting spacer 132 includes the same material as the conductive spacer 131, so that the supporting spacer 132 may have conductivity.

As shown in FIG. 2, a gate metal is formed on the first base substrate 111 and patterned to form the gate line GL, the gate electrode 112a of the thin film transistor 112, and the storage electrode 113. The gate line GL, the gate electrode 112a, and the storage electrode 113 are covered by a gate insulating layer 112b. An active layer and an ohmic contact layer are sequentially formed on the gate insulating layer 112b and patterned to form an active pattern 112c and an ohmic contact pattern 112d in an area in which the gate electrode 112a is formed. Then, a data metal is formed and patterned to form the source electrode 112e and the drain electrode 112f. A protective layer 114 is formed on the gate insulating layer 112b to cover the source electrode 112e and the drain electrode 112f. An organic insulating layer 115 is formed on the protective layer 114.

A contact hole 115a partially exposing the drain electrode 112f is formed through the protective layer 114 and the organic insulating layer 115. Therefore, the pixel electrode 116 formed on the organic insulating layer 115 may be electrically connected to the drain electrode 112f through the contact hole 115a.

The pixel electrode 116, the storage electrode 113, and insulating layers 112b, 114 and 115 interposed between the pixel electrode 116 and the storage electrode 113 form a storage capacitor Cst. The pixel electrode 116, the common electrode 122, and a liquid crystal layer (not shown) interposed between the pixel electrode 116 and the common electrode 122 form a liquid crystal capacitor Clc.

A conductive organic material is formed on the common electrode 122 and patterned to form the conductive spacer 131 and the supporting spacer 132. The conductive organic material may include a material such as conductive carbon.

The conductive spacer 131 has a same height as the supporting spacer 132, however, the supporting spacer 132 makes contact with the array substrate 110, and the conductive spacer 131 is maintained spaced apart from the pixel electrode 116 by a predetermined distance in the absence of a touch event. Since the area in which the thin film transistor 112 is formed has a relatively large number of layers as compared to the other areas, the area in which the thin film transistor 112 is formed is relatively more protruded toward the opposite substrate 120 than the other areas. Thus, even though the supporting spacer 132 has the same height as the conductive spacer 131, the supporting spacer 132 may make contact with the array substrate 110, while maintaining the cell gap.

In FIG. 2, the conductive spacer 131 is shown to be arranged on the common electrode 122. However the conductive spacer 131 may also be interposed between the common electrode 122 and the second base substrate 121. When the conductive spacer 131 is interposed between the common electrode 122 and the second base substrate 121, the common electrode 122 directly makes contact with the pixel electrode 116 when the touch event occurs, so that the conductive spacer 131 does not need to have conductivity.

Figure 3:
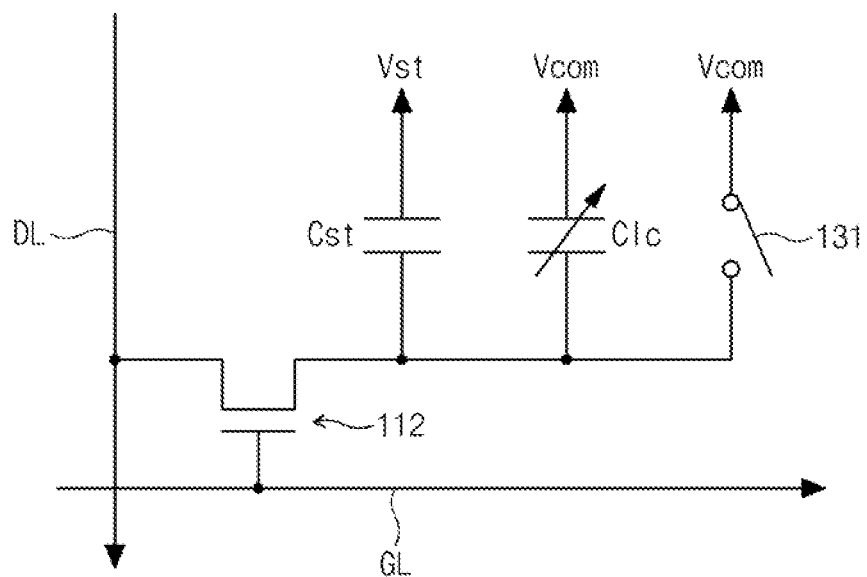
FIG. 3 is an equivalent circuit diagram showing the liquid crystal display panel of FIG. 1 in accordance with an embodiment.

FIG. 3 is an equivalent circuit diagram of the liquid crystal display panel of FIG. 1 in accordance of an embodiment.

Referring to FIG. 3, when a gate voltage is applied to the gate line GL, the thin film transistor 112 is turned on, and a data voltage applied to the data line DL is provided to the liquid crystal capacitor Clc and the storage capacitor Cst through the turned-on thin film transistor 112.

In the absence of a touch event, the conductive spacer 131 (shown in FIG. 2) is electrically insulated from the pixel electrode 116 and a common voltage Vcom is not applied to the pixel electrode 116 (shown in FIG. 2). Thus, when the touch event does not occur, the data line DL maintains the data voltage which is initially applied thereto.

Figure 4:
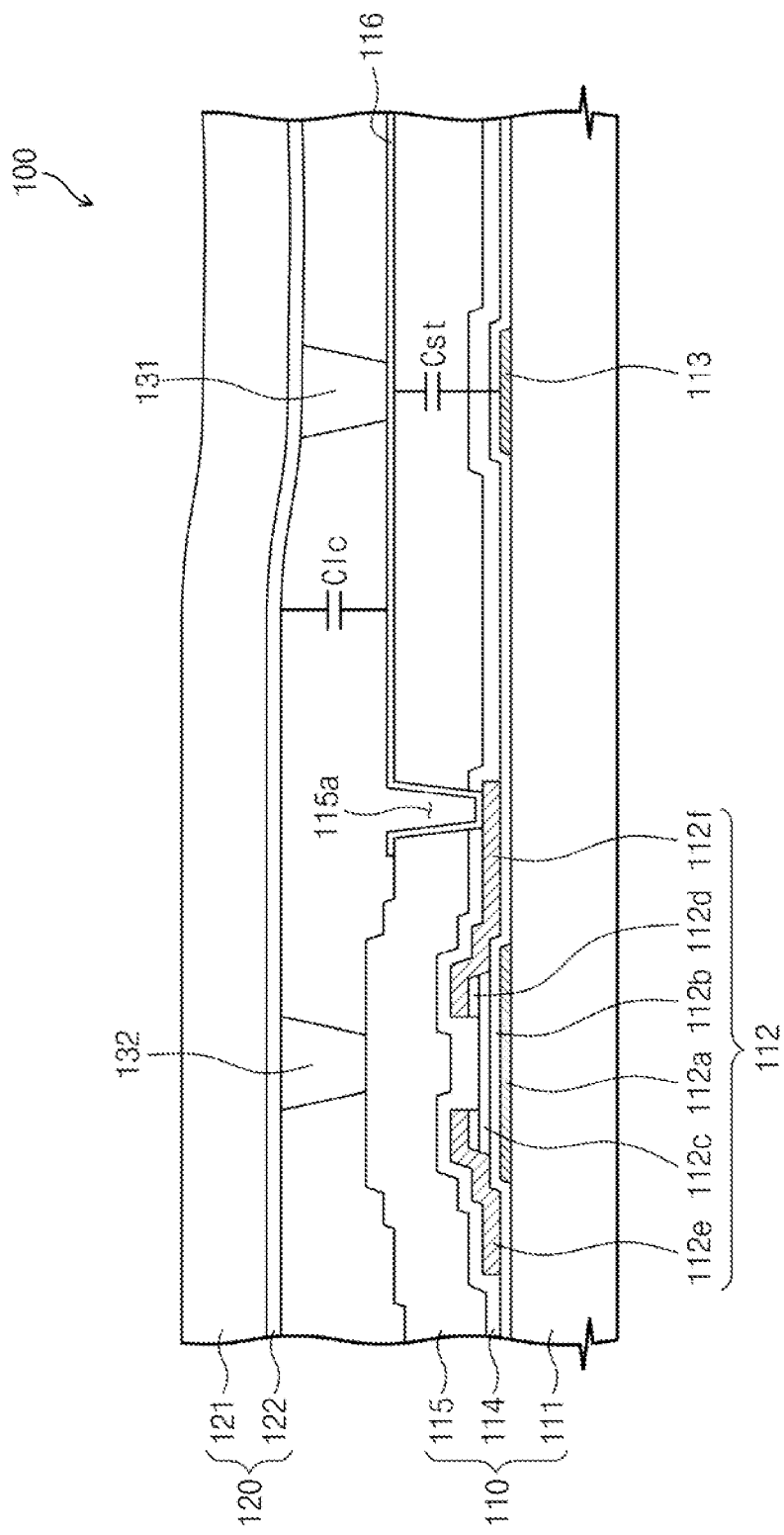
FIG. 4 is a sectional view of a liquid crystal display panel when a touch event occurs in accordance with an embodiment.
Figure 5:
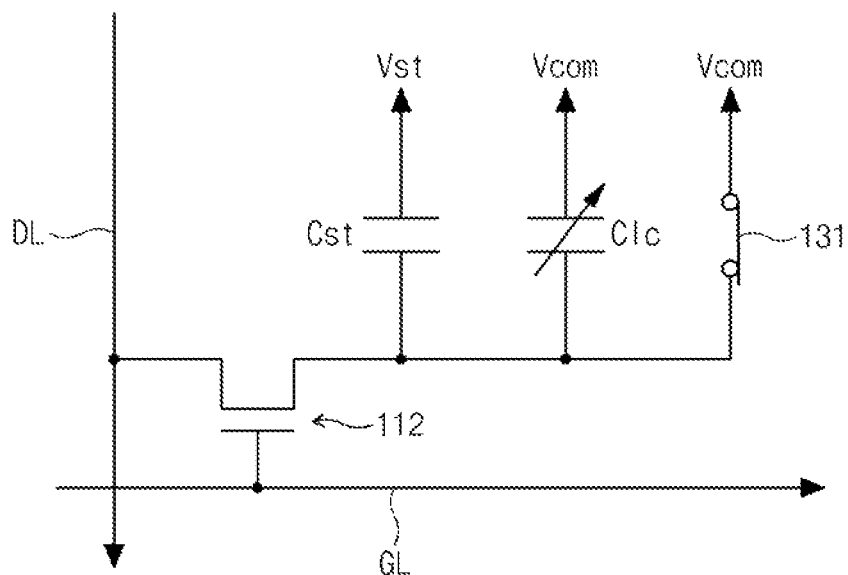
FIG. 5 is an equivalent circuit diagram of a liquid crystal display panel when a touch event occurs in accordance with an embodiment.

FIG. 4 is a sectional view showing the liquid crystal display panel when the touch event occurs, and FIG. 5 is an equivalent circuit diagram showing the liquid crystal display panel when the touch event occurs according to an embodiment.

Referring to FIG. 4, when the touch event occurs, a distance between the opposite substrate 120 and the array substrate 110 is narrowed at a touch position, and the conductive spacer 131 makes contact with the pixel electrode 116. Therefore, the common voltage Vcom applied to the common electrode 122 is transmitted to the pixel electrode 116 through the conductive spacer 131.

As shown in FIG. 5, when the thin film transistor 112 is turned on in response to the gate voltage while the conductive spacer 131 is electrically connected to the pixel electrode 116, the common voltage Vcom is applied to the data line DL through the turned-on thin film transistor 112. That is, an electric potential of the data line DL is lowered by the common voltage Vcom. Thus, the touch position where the touch event occurs may be detected by reading out whether the electric potential of the data line DL is lowered to the common voltage Vcom.

As described above, the touch position at which the touch event occurs may be detected using the data line DL and the gate line GL arranged in a pixel by only adding the conductive spacer 131 that electrically connects the common electrode 122 and the pixel electrode 116 in response to the touch event. As a result, an aperture ratio of the liquid crystal display panel 100 may be improved without additional wires.

In addition, since the conductive spacer 131 is provided in the area in which the storage electrode 113 is formed, the aperture ratio is not decreased by the addition of the conductive spacer 131.

Figure 6:
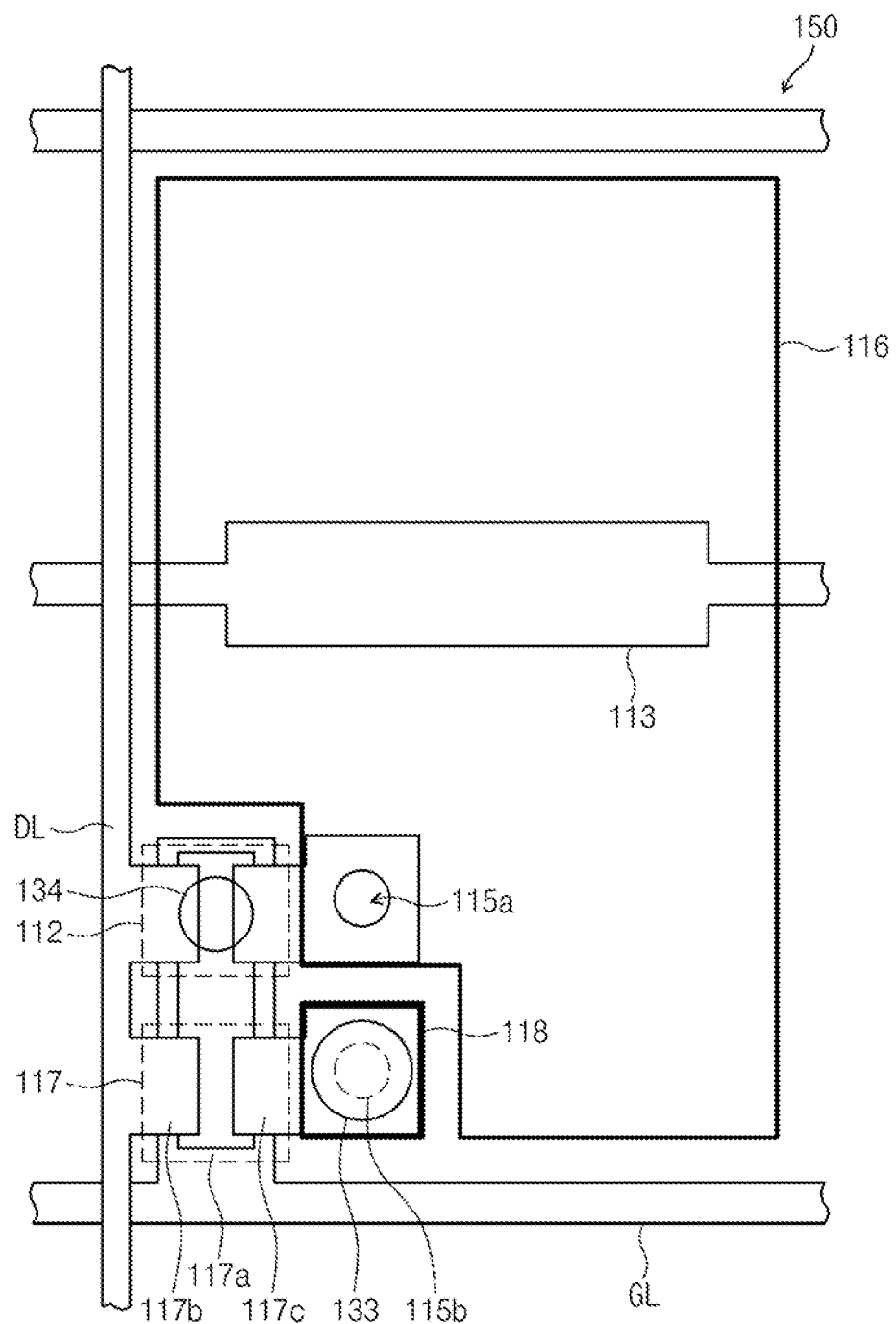
FIG. 6 is a plan view of a liquid crystal display panel in accordance with an embodiment.
Figure 7:
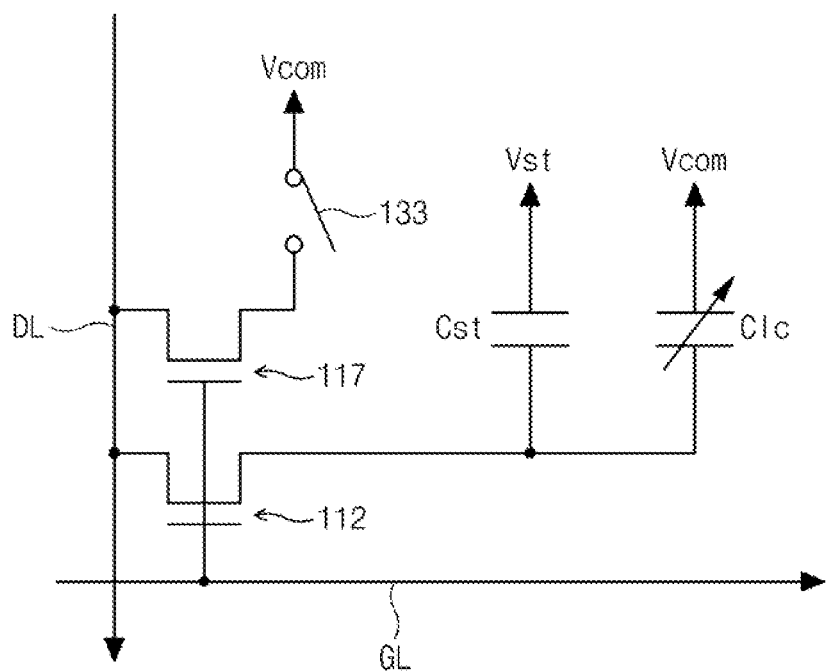
FIG. 7 is an equivalent circuit diagram of the liquid crystal display panel of FIG. 6 in accordance with an embodiment.

FIG. 6 is a plan view of a liquid crystal display panel according to another embodiment, and FIG. 7 is an equivalent circuit diagram showing the liquid crystal display panel of FIG. 6. In FIGS. 6 and 7, the same reference numerals denote the same elements in FIGS. 1 and 3, and thus the detailed descriptions of the same elements are omitted.

Referring to FIG. 6, an array substrate 110 includes a data line DL, a gate line GL, a first thin film transistor 112, a pixel electrode 116, a second thin film transistor 117, and a dummy pixel electrode 118.

The second thin film transistor 117 is connected to the data line DL and the gate line GL. Particularly, the second thin film transistor 117 includes a source electrode 117b connected to the data line DL, a gate electrode 117a connected to the gate line GL, and a drain electrode 117c connected to the dummy pixel electrode 118. The dummy pixel electrode 118 is electrically insulated from the pixel electrode 116.

A protective layer 114 (as shown in FIG. 2) and an organic insulating layer 115 (as shown in FIG. 2) are interposed between the drain electrode 117c and the dummy pixel electrode 118. A second contact hole 115b is formed through the organic insulating layer 115 and the protective layer 114 so that the dummy pixel electrode 118 may be electrically connected to the drain electrode 117c through the second contact hole 115b.

In the present embodiment, a conductive spacer 133 is electrically connected to a common electrode 122 (as shown in FIG. 2) of an opposite substrate 120 (as shown in FIG. 2) and arranged in an area in which the dummy pixel electrode 118 is formed. The conductive spacer 133 is spaced apart from the dummy pixel electrode 118 by a predetermined distance and electrically connected to the dummy pixel electrode 118 when a touch event occurs.

A maintaining capacitor 134 is provided in an area in which the first thin film transistor 112 is formed. However, the maintaining capacitor 134 may be provided in an area in which the second thin film transistor 117 is formed or provided over an area in which the first and second thin film transistors 112 and 117 are formed.

Referring to FIG. 7, the first and second thin film transistors 112 and 117 are commonly connected to the gate line GL, so that the first and second thin film transistors 112 and 117 are substantially simultaneously turned on by a gate voltage applied to the gate line GL. A data voltage applied to the data line DL is provided to a liquid crystal capacitor Clc and a storage capacitor Cst through the turned-on first thin film transistor 112.

Since the conductive spacer 133 is electrically insulated from the dummy pixel electrode 118 while the touch event does not occur, a common voltage Vcom is not applied to the data line DL even though the second thin film transistor 117 is turned on.

When a touch event occurs, the conductive spacer 133 is electrically connected to the dummy pixel electrode 118, and when the second thin film transistor 117 is turned on, the common voltage Vcom is applied to the data line DL. Therefore, a touch position at which the touch event occurs may be detected by reading out whether an electric potential of the data line DL is lowered to the common voltage Vcom.

Figure 8:
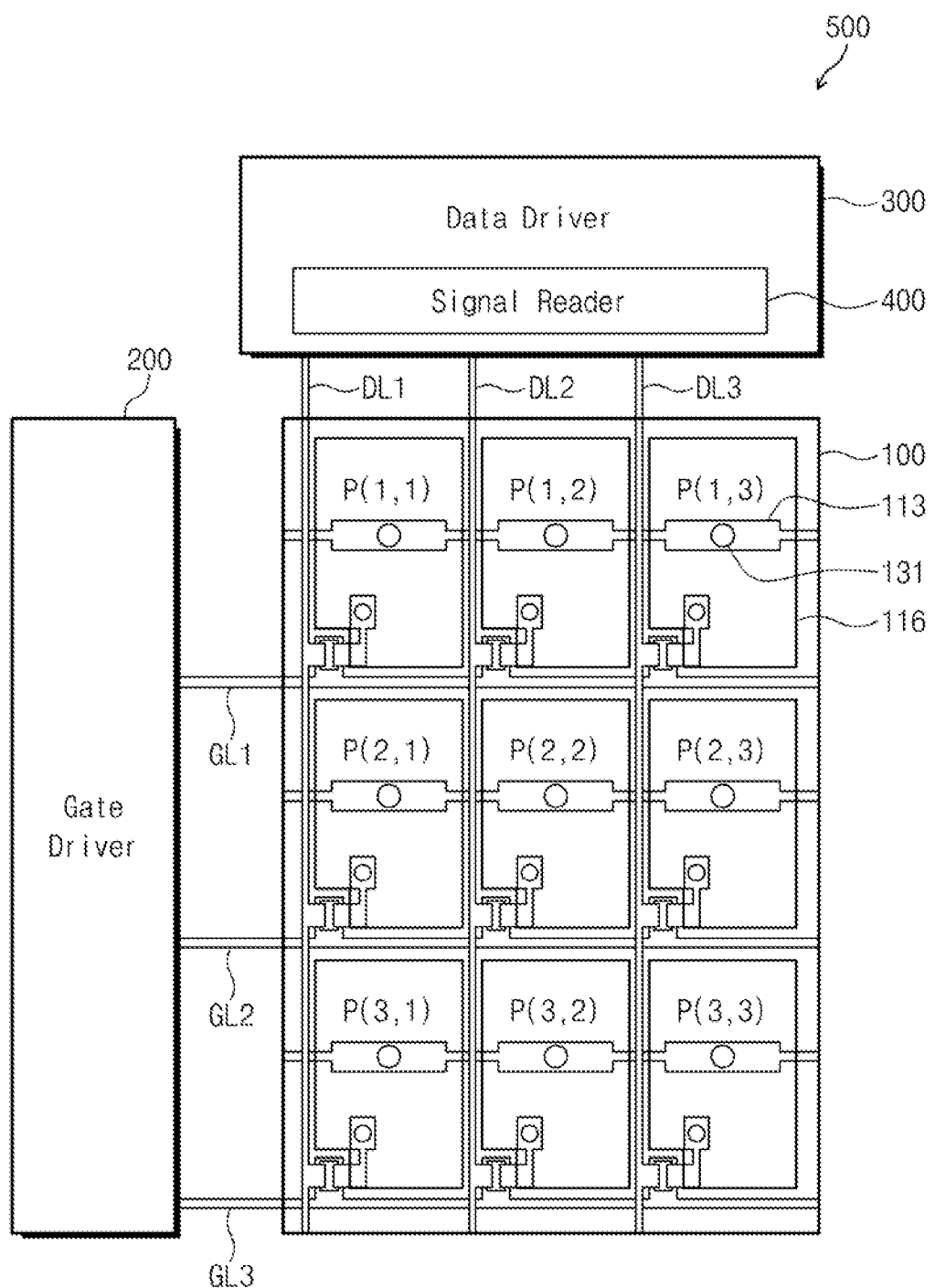
FIG. 8 is a block diagram of a liquid crystal display in accordance with an embodiment.

FIG. 8 is a block diagram of a liquid crystal display in accordance with an embodiment.

Referring to FIG. 8, a liquid crystal display 500 includes a liquid crystal display panel 100, a gate driver 200, a data driver 300, and a signal reader 400. The liquid crystal display panel 100 may have the same structure as shown in FIGS. 1 to 7. In FIG. 8, while nine pixels for the liquid crystal display panel 100 are shown for the convenience of explanation, the number of pixels for the liquid crystal display panel 100 should not be limited to the nine pixels and may be varied.

The gate driver 200 is connected to a first gate line GL1, a second gate line GL2, and a third gate line GL3, and the data driver 300 is connected to a first data line DL1, a second data line DL2, and a third data line DL3. The gate driver 200 may be formed in a chip to be mounted on the liquid crystal display panel 100 or on a film (not shown), or the gate driver 200 may be directly formed on the liquid crystal display panel 100 through a thin film process. The data driver 300 may be formed in a chip and mounted on the liquid crystal display panel 100 or on a film.

The signal reader 400 may be built in the chip in which the data driver 300 is built or may be formed in a separate chip. As an example of an embodiment of the present invention, in FIG. 8, the signal reader 400 that is built in the same chip as the data driver 300 is shown.

When the gate driver 200 sequentially applies a gate voltage to the first to third gate lines GL1, GL2, and GL3, the data driver 300 applies a data voltage to the first to third data lines DL1, DL2, and DL3. Thus, the pixels may display a grayscale corresponding to the data voltage in response to the gate voltage.

The signal reader 400 is electrically connected to the first to third data lines DL1, DL2, and DL3 to periodically read out voltages of the first to third data lines DL1, DL2, and DL3. That is, when a conductive spacer 131 makes contact with a pixel electrode 116 by a touch event, a voltage of a corresponding data line connected to the touched pixel is lowered. Accordingly, the signal reader 400 senses the touch event based on the voltage of the corresponding data line to detect a touch position where the touch event occurs. The touch position may be generated as a coordinate value by a corresponding gate line and a corresponding data line.

As shown in FIG. 8, each of the nine pixels arranged in the liquid crystal display panel 100 may be represented as a coordinate value. That is, a first pixel connected to the first gate line GL1 and the first data line DL1 is represented as a coordinate value of P(1,1), a second pixel connected to the first gate line GL1 and the second data line DL2 is represented as a coordinate value of P(1,2), and a third pixel connected to the first gate line GL1 and the third data line DL3 is represented as a coordinate value of P(1,3). Similar to the above, the remaining pixels may be represented as coordinate values.

For example, when the voltage of the second data line DL2 is lowered by the common voltage Vcom when the gate voltage is applied to the second gate line GL2, the signal reader 400 may detect a fifth pixel P(2,2) as the touch position.

As described above, since the conductive spacer 131 is arranged in the area in which the storage electrode 113 is formed, the conductive spacer 131 does not affect the aperture ratio of the pixels. Therefore, as shown in FIG. 8, the conductive spacer 131 may be formed in each pixel; however, the structure of the conductive spacer 131 should not be limited thereto.

Figure 9A:
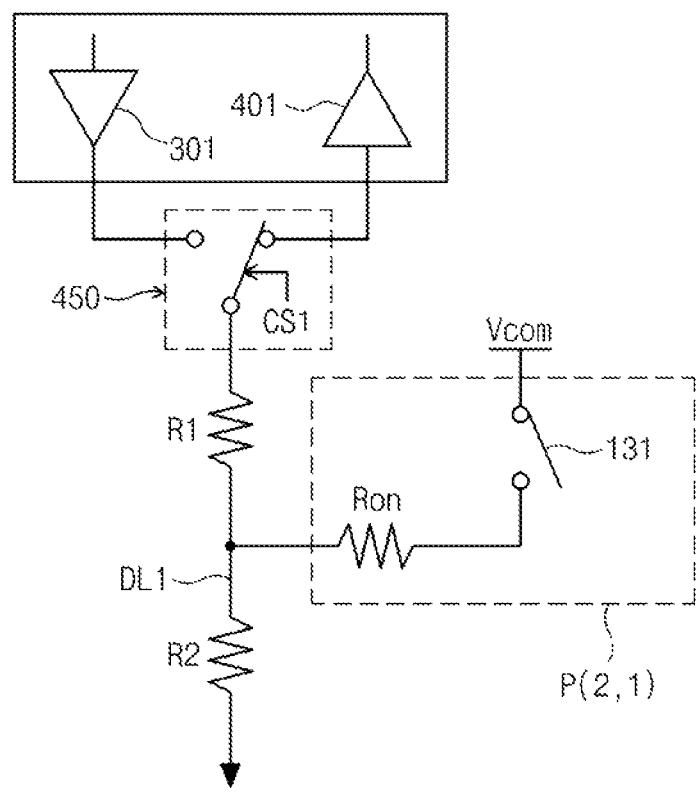
FIG. 9A is a circuit diagram of a read-out process of detecting a voltage of a data line when a touch event does not occur in accordance with an embodiment.
Figure 9B:
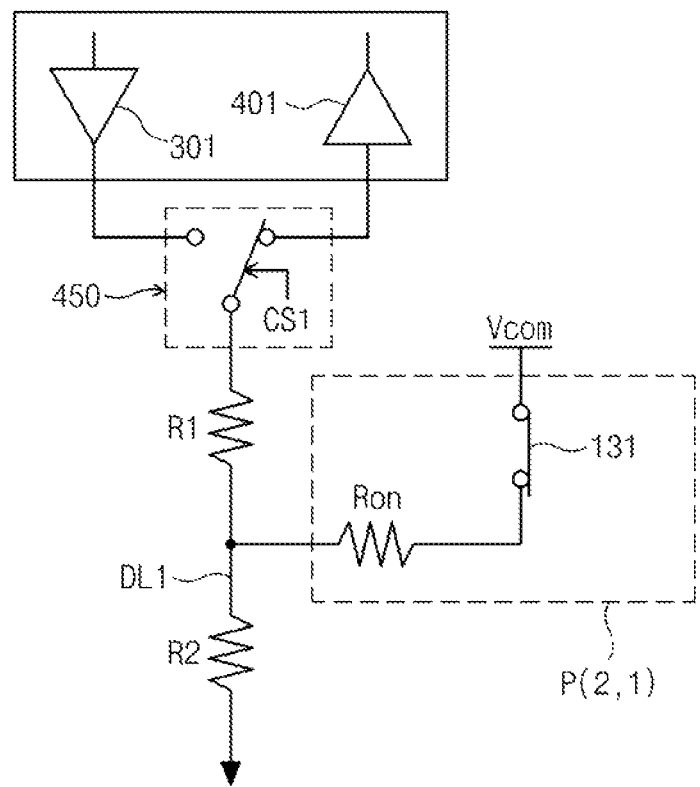
FIG. 9B is a circuit diagram of a read-out process of detecting a voltage of a data line when a touch event occurs in accordance with an embodiment.

FIG. 9A is a circuit diagram showing a read-out process of detecting a voltage of a data line when a touch event does not occur, and FIG. 9B is a circuit diagram showing a read-out process of detecting a voltage of a data line when a touch event occurs.

The data driver 300 includes a plurality of output buffers and the signal reader 400 includes a plurality of comparators. In FIGS. 9A and 9B, however, only a first output buffer 301 and a first comparator 401 connected to the first data line DL1 are described in detail as an example of an embodiment the present invention.

A switching circuit 450 is coupled between the data driver 300 and the signal reader 400. The switching circuit 450 alternately connects the data lines to the data driver 300 and the signal reader 400 in response to a control signal CS1.

That is, the switching circuit 450 connects the data lines to the data driver 300 during a data output period in which the data voltage is applied to a pixel and connects the data lines to the signal reader 400 during a sensing period in which each voltage of the data lines is read out to sense the touch event. The switching operation of the switching circuit 450 is controlled by the control signal CS1. A method of switching of the switching circuit 450 will be described in detail with reference to FIG. 10.

Referring to FIG. 9A, the first data line DL1 is connected to the first comparator 401 by the switching circuit 450 during the sensing period. In FIG. 9A, the pixel P(2,1) among the pixels connected to the first data line DL1 is described as a representative example. In the pixel P(2,1), an inherent resistance when the thin film transistor 112 (shown in FIG. 3) is turned on is referred to as a turn-on resistance Ron. Also, the inherent resistances of other pixels connected to the first data line DL1 are referred to as a first resistance R1 and a second resistance R2.

When the touch event does not occur in the pixel P(2,1), the common voltage Vcom from the conductive space 131 is not applied to the pixel electrode of the pixel P(2,1). For instance, when the first output buffer 301 applies a voltage of about 12V to the pixel P(2,1) during the data output period, an electric potential of a first node N1 to which the first data line DL1 and the pixel P(2,1) are connected is maintained at the voltage of about 12V during the sensing period. Thus, the first comparator 401 may detect the voltage of about 12V from the first data line DL1.

As shown in FIG. 9B, when the conductive spacer 131 contacts the pixel electrode of the pixel P(2,1) by the touch event, the common voltage Vcom is applied to the first node N1. Therefore, the electric potential of the first node N1 is lowered to the common voltage Vcom. For instance, when the common voltage Vcom is about 6V, the electric potential of the first node N1 would be about 5.46V. In general, the first node N1 has an electric potential that is lower than the common voltage Vcom due to the turn-on resistance Ron, however, an electric potential difference between the first node N1 and the common voltage Vcom is no more than about 1V.

As described above, when the voltage of about 5.46V is read out from the first data line DL1 during the sensing period, the first comparator 401 recognizes the touch event and generates the coordinate value of the pixel P(2,1).

The signal reader 400 compares the read-out voltage from the first data line DL1 with a predetermined reference voltage to sense the touch event. Particularly, when the read-out voltage is equal to the reference voltage, the signal reader 400 senses that the touch event occurs, and when the read-out voltage is not equal to the reference voltage, the signal reader 400 senses that the touch event did not occur. In the present exemplary embodiment, the reference voltage may be the same as the common voltage Vcom. In addition, the signal reader 400 may set the range of the reference voltage to include a voltage that is higher or lower by the reference voltage than the common voltage Vcom, taking into account the turn-on resistance Ron. In this case, the signal reader 400 checks whether the read-out voltage is in the range of the reference voltage to sense the touch event.

Figure 10:
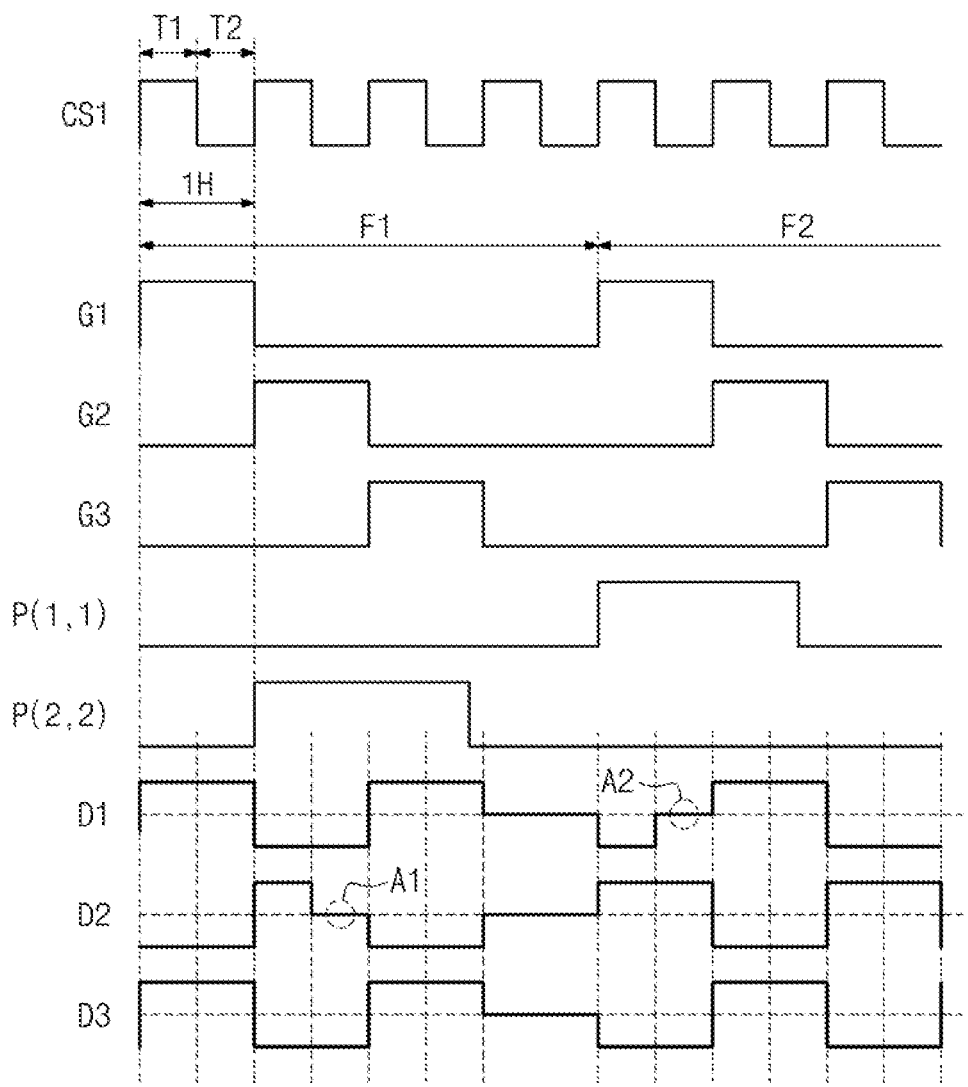
FIG. 10 is a waveform diagram of a touch sensing period in accordance with an embodiment.

FIG. 10 is a waveform diagram showing an exemplary embodiment of a touch sensing period according to an exemplary embodiment of the present invention.

Referring to FIG. 10, the control signal CS1 applied to the switching circuit 450 is in a high state during a first period T1 of a high period (hereinafter, referred to as a "1H period") of each of first, second, and third gate voltages G1, G2, and G3 and in a low state during a remaining second period T2 of the 1H period of each of the first, second, and third gate voltages G1, G2, and G3. A ratio of the first period T1 to the second period T2 may be adjusted to 1:1 or 2:1, for example.

A first data voltage D1, a second data voltage D2, and a third data voltage D3 are applied to a first data line DL1, a second data line DL2, and a third data line DL3, respectively, during the 1H period in which the first gate voltage G1 is applied. Each of the first, second, and third data voltages D1, D2, and D3 may be inverted at every 1H period with reference to the common voltage Vcom and may have an opposite polarity to a data voltage adjacent thereto.

As shown in FIG. 10, in a first frame F1, the signal reader 400 (shown in FIG. 8) may read out the second data voltage D2 that is lowered to the common voltage Vcom during the second period T2 (indicated as "A1" in FIG. 10) among the 1H period in which the second gate voltage G2 is applied, thereby sensing the touch event occurring at the pixel P(2,2).

In addition, in a second frame F2, the signal reader 400 may read out the first data voltage D1 that is lowered to the common voltage Vcom during the second period T2 (indicated as "A2" in FIG. 10) among the 1H period in which the first gate voltage G1 is applied, so that the signal reader 400 may sense the touch event occurring at the pixel P(1,1).

As described above, since the touch position at which the touch event occurs is generated as the coordinate value, the above-described structure of an embodiment of the present invention may be applied not only to a touch sensing method that generates one coordinate value with respect to one touch event but also to a multi-touch method in which multiple touch events substantially simultaneously occur.

In FIG. 10, the touch sensing method where the data voltage is read out during the second period T2 to sense the touch operation after dividing the 1H period into the first period T1 and the second period T2 is described.

Figure 11:
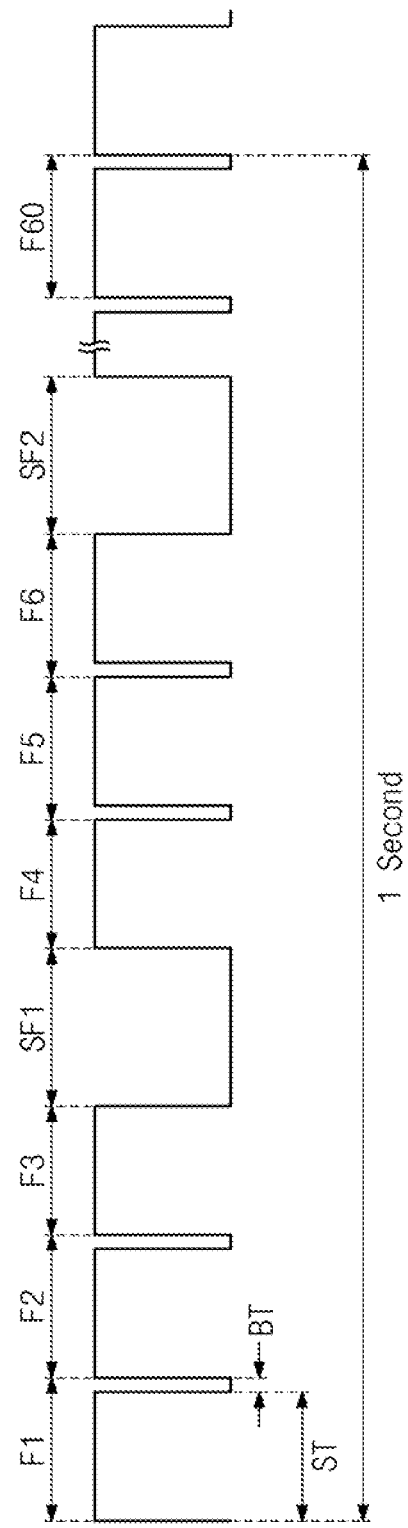
FIG. 11 is a waveform diagram of a touch sensing period in accordance with another embodiment.

FIG. 11 is a waveform diagram showing a touch sensing period in accordance with an embodiment.

'Referring to FIG. 11, frames (F1~F60) used to display images are generated at 60 frames-per-second, and sensing frames SF1 and SF2 used to sense the touch event are inserted into the 60 frames (F1~F60) at every predetermined frame unit. In FIG. 11, the sensing frames SF1 and SF2 may be inserted every three frames.

One frame includes a scan period ST during which an image is displayed and a blank period BT during which a scan signal is reset. The sensing frames SF1 and SF2 may include the blank period BT of a last frame.

Although not shown in FIG. 11, the gate voltage is sequentially applied to the gate lines GL1, GL2, and GL3 of the liquid crystal display panel 100 during the sensing frames SF1 and SF2, and a predetermined data voltage may be uniformly applied to the data lines DL1, DL2, and DL3. The predetermined data voltage has a different voltage level from the common voltage Vcom. The data voltages that are applied to the data lines DL1, DL2, and DL3 during a previous frame may be applied again to the data lines DL1, DL2, and DL3 during the sensing frames SF1 and SF2.

Figure 12:
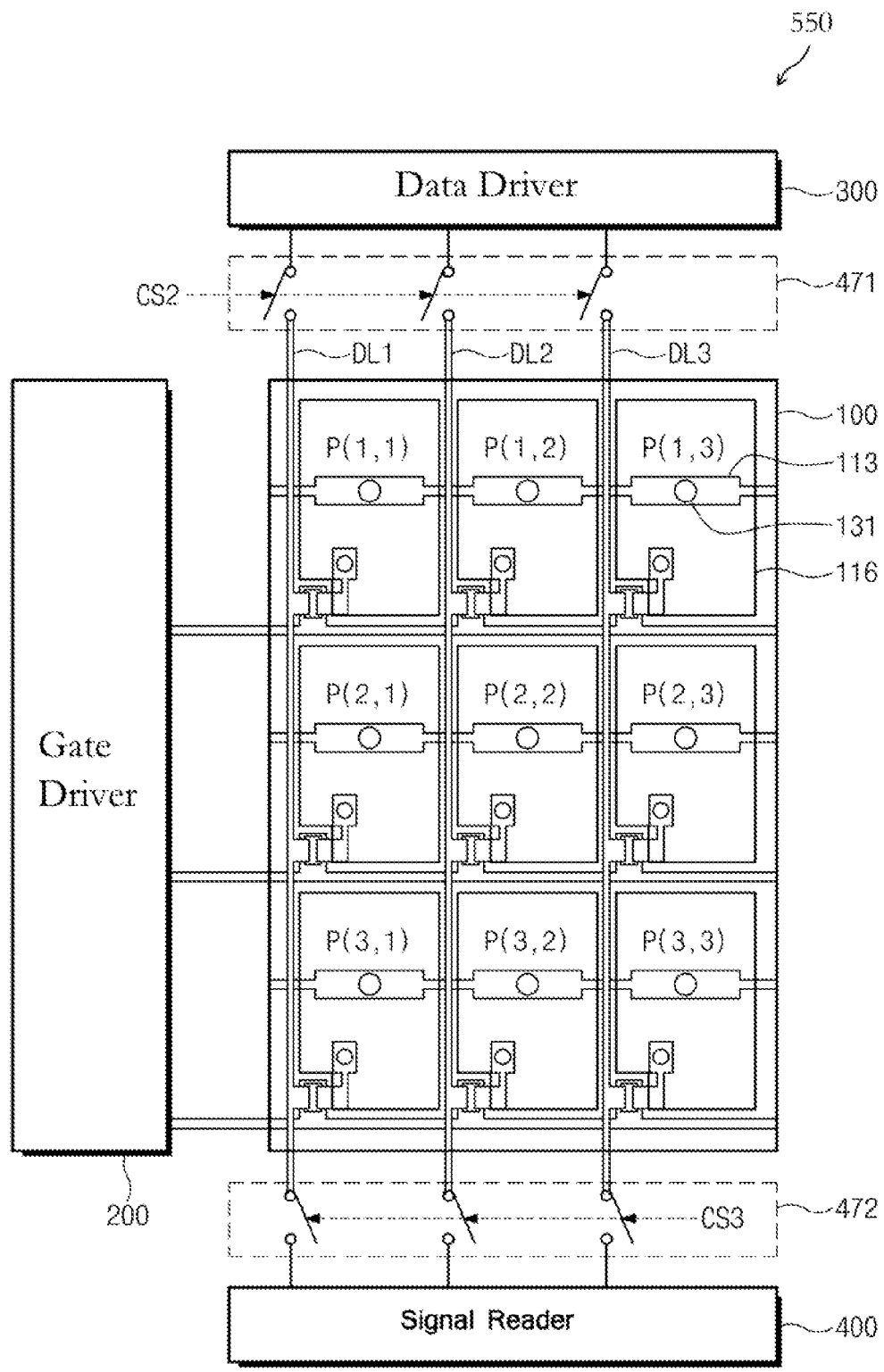
FIG. 12 is a block diagram of another exemplary embodiment of a liquid crystal display in accordance with an embodiment.

FIG. 12 is a block diagram of a liquid crystal display in accordance with an embodiment. In FIG. 12, the same reference numerals denote the same elements in FIG. 8, and thus the detailed descriptions of the same elements are omitted.

Referring to FIG. 12, a liquid crystal display 550 includes a liquid crystal display panel 100, a gate driver 200, a data driver 300, a signal reader 400, a first switching circuit 471, and a second switching circuit 472.

The data driver 300 is arranged adjacent to a first end of first, second, and third data lines DL1, DL2, and DL3, and the signal reader 400 is arranged adjacent to a second end of the first, second, and third data lines DL1, DL2, and DL3. Thus, the data driver 300 may be built in a chip different from a chip in which the signal reader 400 is built.

The first switching circuit 471 is arranged between the data driver 300 and the first end of the first, second, and third data lines DL1, DL2, and DL3, and the second switching circuit 472 is arranged between the signal reader 400 and the second end of the first, second, and third data lines DL1, DL2, and DL3.

The first switching circuit 471 connects the data driver 300 to the first to third data lines DL1, DL2, and DL3 in response to a first control signal CS2, and the second switching circuit 472 connects the signal reader 400 to the first to third data lines DL1, DL2, and DL3 in response to a second control signal CS3. The first control signal CS2 has a phase opposite to the second control signal CS3, so the data driver 300 and the signal reader 400 may be alternately connected to the first to third data lines DL1, DL2, and DL3.

When the data driver 300 is connected to the first to third data lines DL1, DL2, and DL3 by the first control signal CS2, the first to third data lines DL1, DL2, and DL3 receive a data voltage from the data driver 300. When the signal reader 400 is connected to the first to third data lines DL1, DL2, and DL3 by the second control signal CS3, the signal reader 400 may read out the voltage of the first to third data lines DL1, DL2, and DL3.

According to the above, the conductive spacer interposed between the array substrate and the opposite substrate electrically connects the pixel electrode and the common electrode in response to the touch event to lower an electric potential of the data line to a common voltage. The signal reader periodically reads out the voltage of the data line to sense the touch event using the read-out voltage and detect the position at which the touch event occurs.

Thus, the display panel having a touch screen function may be manufactured, and an aperture ratio may be prevented from being deteriorated (e.g., reduced) since additional wires are not required to be added to the display panel.

Although exemplary embodiments are described, it is understood that the present invention should not be limited to these exemplary embodiments but various changes and modifications can be made by one ordinary skilled in the art within the spirit and scope of the present invention as hereinafter claimed.

What is claimed is:

1. A display panel comprising:
    an array substrate including a first base substrate, a data line arranged on the first base substrate, a gate line crossing the data line, a first switching device connected to the data line and the gate line, and a pixel electrode connected to the first switching device;
    an opposite substrate including a second base substrate facing the first base substrate and a common electrode arranged on the second base substrate; and
    a conductive spacer interposed between the array substrate and the opposite substrate and connected to the common electrode, the conductive spacer configured to electrically connect the data line and the common electrode in response to an external pressure,
    wherein the conductive spacer is spaced apart from the array substrate by a predetermined distance when no external pressure is applied,
    wherein the array substrate comprises a second switching device connected to the data line and the gate line, and a dummy pixel electrode connected to the second switching device and electrically insulated from the pixel electrode, and
    wherein the conductive spacer is arranged in a position at which the dummy pixel electrode is formed, so as to make contact with the dummy pixel electrode in response to the external pressure.

2. The display panel of claim 1, wherein the conductive spacer is arranged in an area in which the pixel electrode is formed, so as to make contact with the pixel electrode in response to the external pressure.

3. The display panel of claim 2, wherein the array substrate further comprises a storage electrode which extends substantially in parallel with the gate line and overlaps with the pixel electrode, and the conductive spacer is arranged in an area where the storage electrode is formed.

4. The display panel of claim 1, wherein the conductive spacer is arranged on the common electrode.

5. The display panel of claim 1, wherein the array substrate further comprises a supporting spacer arranged in an area in which the first switching device is formed, so as to maintain a cell gap between the array substrate and the opposite substrate.

6. A display apparatus comprising:
    a display panel comprising:
        an array substrate including a first base substrate, a data line arranged on the first base substrate, a gate line crossing the data line, a switching device connected to the data line and the gate line, and a pixel electrode connected to the switching device;
        an opposite substrate including a second base substrate facing the first base substrate and a common electrode arranged on the second base substrate; and
        a conductive spacer interposed between the array substrate and the opposite substrate and connected to the common electrode, the conductive spacer configured to electrically connect the data line and the common electrode when a touch event occurs;
    a data driver adapted to apply a data voltage to the data line;
    a gate driver adapted to apply a gate signal to the gate line; and
    a signal reader adapted to sense the touch event using a voltage of the data line and detect a position at which the touch event occurs,
    wherein the conductive spacer is spaced apart from the array substrate by a predetermined distance when no external pressure is applied,
    wherein the array substrate comprises a second switching device connected to the data line and the gate line, and a dummy pixel electrode connected to the second switching device and electrically insulated from the pixel electrode, and
    wherein the conductive spacer is arranged in a position at which the dummy pixel electrode is formed, so as to make contact with the dummy pixel electrode in response to the external pressure.

7. The display apparatus of claim 6, wherein the conductive spacer is arranged in an area where the pixel electrode is formed, so as to make contact with the pixel electrode when the touch event occurs.

8. The display apparatus of claim 7, wherein the array substrate further comprises a storage electrode which extends substantially in parallel with the gate line and overlaps the pixel electrode, and the conductive spacer is arranged in a position where the storage electrode is formed.

9. The display apparatus of claim 6, wherein the conductive spacer is arranged on the common electrode.

10. The display apparatus of claim 6, wherein the data driver and the signal reader are part of a first chip and the first chip is connected to one end of the data line.

11. The display apparatus of claim 10, further comprising a switching circuit adapted to alternately couple the data line to the data driver and the signal reader.

12. The display apparatus of claim 6, wherein the data driver is part of a first chip, and the signal reader is part of a second chip different from the first chip, the data driver is connected to a first end of the data line, and the signal reader is connected to a second end of the data line.

13. The display apparatus of claim 12, further comprising:
    a first switching circuit coupled between the first end of the data line and the data driver; and
    a second switching circuit coupled between the second end of the data line and the signal reader.

14. A method of driving a display apparatus, the method comprising:

applying a gate voltage to a gate line to turn on a first switching device;

applying a data voltage to a data line to provide the data voltage to a pixel electrode through the turned-on first switching device;

electrically connecting the data line and a common electrode through a conductive spacer and a second switching device in response to a touch event, so as to lower a voltage of the data line, and electrically disconnecting the data line and the common electrode when no touch event occurs, wherein the second switching device is connected to the data line, the gate line and a dummy pixel electrode which is insulated from the pixel electrode, and wherein the conductive spacer is arranged in a position at which the dummy pixel electrode is formed, so as to make contact with the dummy pixel electrode in response to the external pressure;

sensing the voltage of the data line; and reading out the sensed voltage to sense the touch event and detect a position at which the touch event occurs.

15. The method of claim 14, wherein the detecting of the position at which the touch event occurs comprises:

comparing the sensed voltage with a predetermined reference voltage; and recognizing the touch event when the sensed voltage is equal to the reference voltage.

16. The method of claim 14, wherein prior to the sensing of the voltage of the data line, the method further comprising:

switching the data line between a data driver which provides the data voltage to the data line and a signal reader which senses the voltage of the data line.

17. The method of claim 16, wherein the data voltage is applied to the data line during a first period of a horizontal scanning period (1H period) during which the gate voltage is applied, and wherein the voltage of the data line is sensed during a remaining second period of the horizontal scanning period.

18. The method of claim 16, wherein a sensing frame during which the voltage of the data line is read out is inserted at every predetermined frame unit.

19. The display panel of claim 1, wherein the conductive spacer is maintained spaced apart from the pixel electrode by a predetermined distance in the absence of the external pressure.

20. The display panel of claim 19, wherein the data line and the common electrode electrically disconnect in the absence of the external pressure.

21. The display panel of claim 1, wherein the external pressure is applied to an area on the opposite substrate proximate to where the conductive spacer is formed.

* * * * *